United States Patent
Campanini

[11] 3,713,702
[45] Jan. 30, 1973

[54] MODULATED SPRING BRAKE

[75] Inventor: Sergio Campanini, Lincolnwood, Ill.

[73] Assignee: The Berg Manufacturing Company, Des Plaines, Ill.

[22] Filed: Feb. 2, 1971

[21] Appl. No.: 112,057

Related U.S. Application Data

[63] Continuation of Ser. No. 854,605, Sept. 2, 1969, abandoned, and a continuation of Ser. No. 73,555, Sept. 18, 1970, abandoned.

[52] U.S. Cl. ...........................303/9, 92/64, 303/2, 303/13
[51] Int. Cl. .........................B60t 13/40, B60t 15/00
[58] Field of Search .............303/2, 9, 13; 92/63, 64; 188/170, 106 P

[56] References Cited

UNITED STATES PATENTS

| 3,090,359 | 5/1963 | Hoppenstand | 92/63 X |
| 3,385,636 | 5/1968 | Cruse | 303/9 UX |
| 3,515,438 | 6/1970 | Stevenson et al. | 303/9 |
| 3,504,947 | 4/1970 | Valentine | 303/9 X |
| 3,309,149 | 3/1967 | Bueler | 303/9 UX |
| 3,302,530 | 2/1967 | Dobrikin et al. | 303/9 |

*Primary Examiner*—Milton Buchler
*Assistant Examiner*—John J. McLaughlin
*Attorney*—Howard T. Markey et al.

[57] ABSTRACT

In a vehicle brake system having a service brake actuating chamber and a spring-applied, fluid pressure emergency brake-actuating chamber, a system supplying fluid pressure to the spring side of the movable wall in the emergency chamber in response to loss of pressure to the service chamber and operation of the brake application valve.

9 Claims, 3 Drawing Figures

3,713,702

INVENTOR.
Sergio Campanini
BY Parker Carter & Markey
Attorneys.

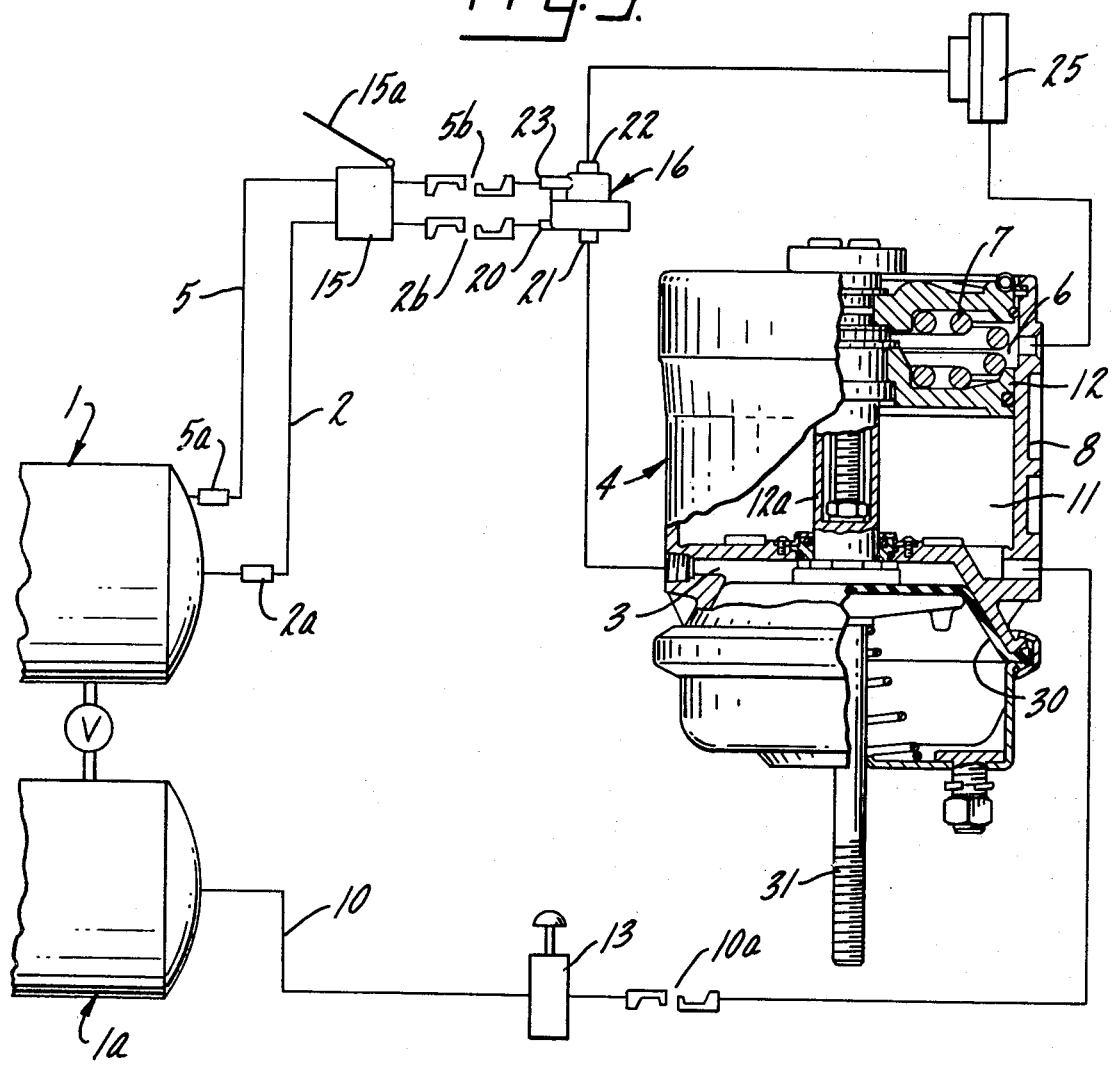

MODULATED SPRING BRAKE

SUMMARY OF THE INVENTION

This is a continuation of my co-pending applications Ser. No. 854,605, filed Sept. 2, 1969, now abandoned and Ser. No. 73,555, filed Sept. 18, 1970, now abandoned.

Herein disclosed is a brake system having a main service pressure line and an auxiliary service pressure line, an application valve transmitting pressures in both said lines, a special check valve closing the auxiliary service line in response to pressure in the main service line and opening the auxiliary service line in response to loss of pressure in the main service line, the auxiliary line delivering fluid pressure to the spring side of a movable wall in the emergency brake chamber of a spring-applied fluid pressure-retracted emergency brake operating chamber, the pressure thus supplied canceling out the effect of an equal portion of the fluid pressure in the emergency chamber and enabling the spring to actuate the brakes in modulated response to the vehicle operator's operation of the application valve.

This invention relates to vehicle fluid pressure brake systems and has for one of its purposes the provision of a modulated spring brake system.

Another purpose is to provide a modulated spring brake system operable in response to actuation of a brake application valve.

Another purpose is to provide a modulated spring brake operation in response to loss of pressure in the service line of a brake system.

Another purpose is to provide a modulated spring brake system which shall retain in full its emergency brake application capacity.

Another purpose is to provide a modulated spring brake system which shall be rendered inoperative so long as the main service system remains operative.

Another purpose is to provide a modulated spring brake system requiring a minimum number of parts and minimum modification of existing systems.

Another purpose is to provide a modulated spring brake system of maximum simplicity and economy.

Other objects may appear from time to time during the course of the following specification and claims.

BRIEF DESCRIPTION OF THE DRAWINGS

The invention is illustrated more or less diagrammatically in the following drawings wherein:

FIG. 3 is a schematic showing of a modified form of the system of the invention.

DESCRIPTION OF THE PREFERRED EMBODIMENTS

Figure 1:
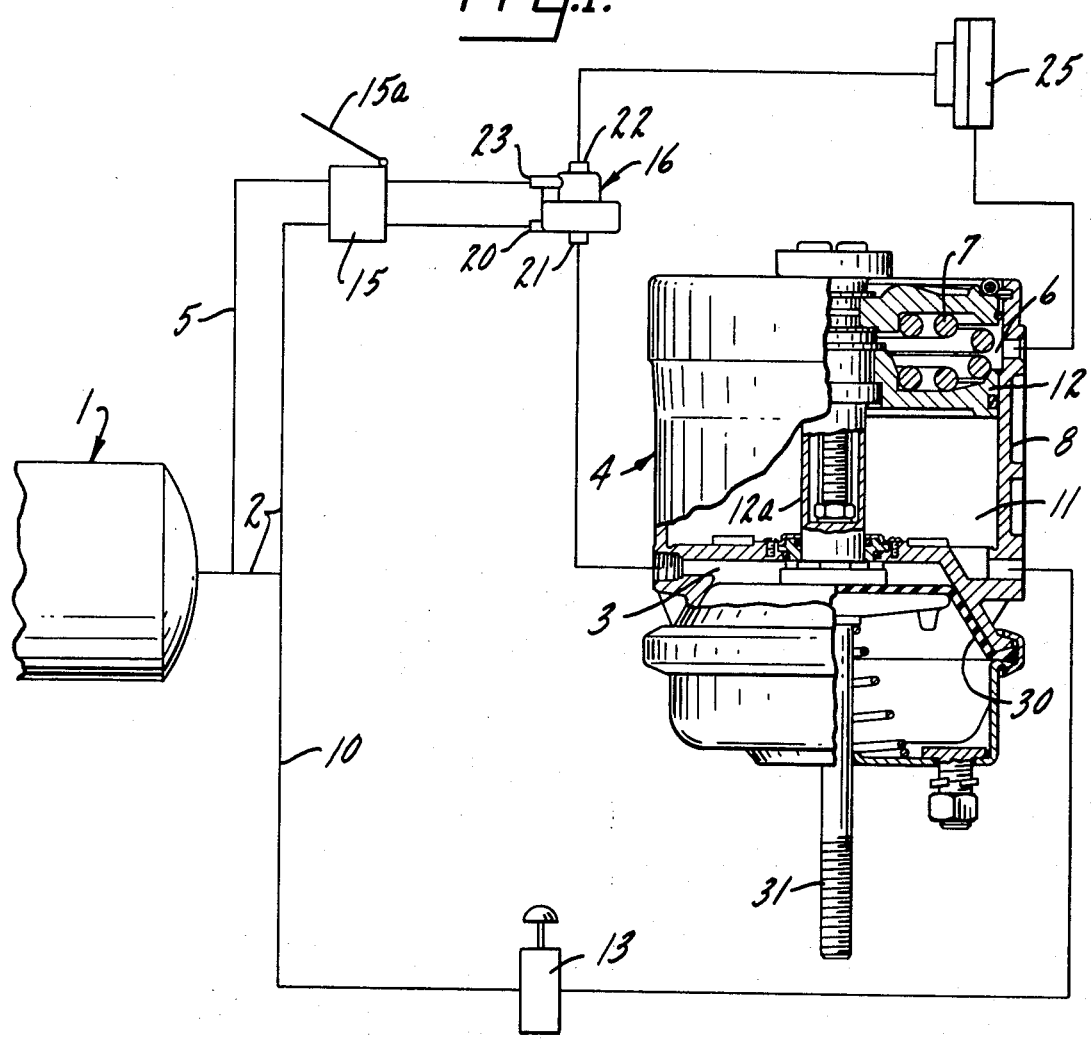
FIG. 1 is a schematic showing of the system of the invention.

Referring now to the drawings, and particularly to FIG. 1, the numeral 1 generally designates a tank or fluid pressure reservoir. A main service line 2 communicates the tank with the service chamber 3 of a brake actuator generally indicated by the numeral 4.

An auxiliary service line 5 communicates the tank 1 with the area 6 occupied by the spring 7 in the emergency chamber 8 of actuator 4.

A conventional emergency fluid pressure line 10 communicates the tank 1 with the area 11 on the opposite side of movable wall 12 from the spring 7 within the chamber 8. A standard dash control valve 13 is provided in the line 10.

A dual application valve is indicated at 15. Valve 15 controls transmission of fluid pressure in both the main service line 2 and the auxiliary service line 5. It will be understood that the application valve is operated by a suitable foot pedal 15a available to the vehicle operator. While the application valve is indicated schematically at 15, a suitable dual application valve may take the form, for example, of the valve shown in U.S. Pat. No. 3,449,020 entitled "Dual Force Treadle Application Valve" and issued June 10, 1969.

Figure 2:
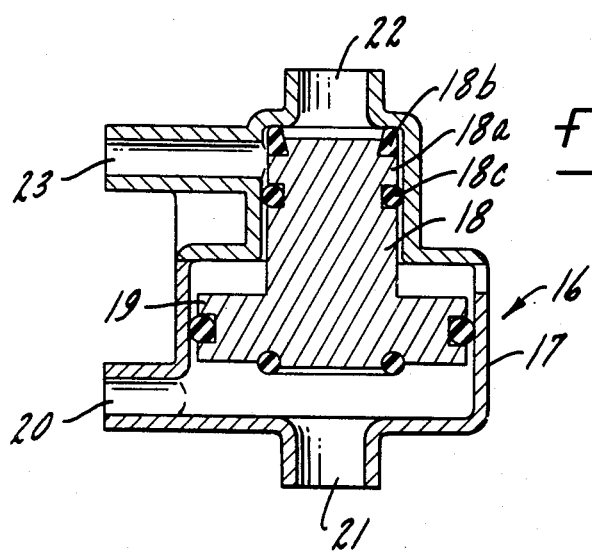
FIG. 2 is a side view and partial cross-section of a valve useful in the system.

In the lines 2 and 5, downstream of valve 15, a special check valve 16 is positioned. As illustrated in FIG. 2, the valve 16 may suitably include a housing 17 in which a dual-headed valve piston member 18 is reciprocal. The valve 18 has a larger head 19 exposed to main service line pressure passing from inlet 20 to outlet 21 in the housing 17. A reduced portion 18a of the valve member 18 carries a seal 18b for closing the housing 17 against the passage of auxiliary service pressure therethrough and a seal 18c exposed to auxiliary line pressure. As illustrated, the service pressure in housing 17 is holding the seal 18b against its seat closing auxiliary line outlet 22 from communication with auxiliary line inlet 23. Between valve 16 and actuator 4 a suitable quick release valve 25 may be connected in the auxiliary line 5. An effective quick release valve, for example, may be that of the type shown in U.S. Pat. No. 3,093,153, entitled "Quick Release Valve" issued June 11, 1963.

FIG. 3 shows a modified system having an emergency tank or reservoir 1a connected to the tank 1 by a check valve which permits flow into the emergency tank but prohibits backflow into the tank 1. In this modification, the emergency fluid pressure line 10 is connected to the auxiliary tank 1a. Also, conventional gladhand connectors 2b, 5b and 10a are provided respectively in the main service line 2, auxiliary service line 5 and emergency fluid pressure line 10. These gladhand connectors are provided when the actuator 4 and associated elements are located on a trailer. In such a situation, tanks 1, 1a and valves 13 and 15 are located on a tractor.

Valves 2a and 5a are provided respectively in the main service line 2 and auxiliary service line 5. These values protect against loss of fluid pressure in either line 2 or 5 upstream of the valve 16. While the normally experienced loss of service pressure occurs through rupture of diaphragm 30 and in such an event line 2 between valve 16 and chamber 3 is closed by piston 19 against outlet 21 when pressure is lost in chamber 3 for any reason, the valves 2a and 5a may be useful as insurance against loss of pressure from tank 1. It will be realized that any suitable form of valve may be employed at 2a and 5a or individual tanks could be supplied for each line 2, 5 and 10. The manner of pressure supply may be varied without departing from the nature and scope of the invention. A suitable valve for use at 2a, 5a with a tank 1, for example, is shown in the U.S. Pat. No. 3,292,655, issued Dec. 20, 1966 and entitled "Flow Sensing Shut-Off Valve."

The use, operation and function of the invention are as follows:

The vehicle operator actuates valve 15 by movement, for example, of the foot pedal shown schematically at 15a. The dual application valve 15 thus transmits equal amounts of fluid pressure through the lines 2 - 5. When the main service line 2 is in effective operation, the service pressure passing through the synchro check valve 16 holds the piston 18 in position to close outlet 22 and thus precludes passage of auxiliary service pressure beyond the valve 16. The main service line thus transmits fluid pressure to the service chamber 3 of the actuator 4 to move the diaphragm 30 and actuating rod 31 in the conventional manner to apply the brakes.

As is well known, emergency fluid pressure is supplied through the line 10 and a suitable dash control valve 13, (an example of which may be found in U.S. Pat. No. 3,096,789 entitled "Dash Control Park Brake Valve" issued July 9, 1963) to the area 11 within the emergency chamber 8 of the actuator 4. The emergency fluid pressure thus supplied holds the movable wall 12 in retracted position and the spring 7 in compressed state. Should the operator wish to employ the spring 7 for application of the brakes in an emergency or for parking, the operator opens the valve 13 to exhaust the area 11 and thus enables the spring 7 to move the wall 12 and its extension 12a and thus to move the diaphragm 30 and rod 31 in brakes-on direction. The same result occurs automatically upon loss of emergency pressure. The present invention in no way interferes with or affects said emergency brake operating means or operation.

Should there be a rupture of diaphragm 30, a break in line 2 or other failure or the main service system, actuation of the application valve 15 will again deliver service pressure through the line 5 through said valve 15 to the valve 16. With the loss of main service pressure, however, the valve shuttle 18 will be in a position closing outlet 21 and opening outlet 22, thus transmitting auxiliary service pressure through the quick release valve 25 to the area 6 in which the spring 7 is positioned. Fluid pressure thus entering the area 6 counteracts or cancels out an equivalent amount of the pressure in area 11 and the spring 7 is thus freed to operate to that extent. Thus the level of pressure demanded by the operator in operation of foot pedal 15a will be reflected in the amount of operation of the spring 7 and a modulated spring brake operation will result. Upon release of the pedal 15a by the vehicle operator the pressure supplied to area 6 will be exhausted through valve 25 and the pressure within area 11 will return the movable wall 12 to the position shown and will thus release the brakes.

I claim:

1. A fluid pressure brake system including a brake actuator having a service chamber and an emergency chamber, a first movable wall in said service chamber, a second movable wall in said emergency chamber, an application valve, a first conduit communicating said application valve with said service chamber on one side of said first movable wall to urge said first movable wall in brakes-on direction, a second conduit communicating said application valve with said emergency chamber on one side of said second movable wall to urge said second movable wall in brakes-on direction, a differential valve connected in said conduits downstream of said application valve and effective to open said second conduit in response to loss of pressure in said first conduit between said differential valve and said service chamber.

2. The structure of claim 1 characterized by and including automatic exhaust valve means in said second conduit and automatically openable to exhaust position in response to deactivation of said application valve.

3. A fluid pressure vehicle brake system including brake actuator means having a service chamber and an emergency chamber, a movable wall in the emergency chamber, a spring on one side of said wall in the emergency chamber urging said wall in brakes-on direction, an emergency line communicating a source of fluid pressure with said emergency on the opposite side of said wall to urge said wall in brakes-off direction, a main service pressure line communicating a source of fluid pressure with said service chamber, an auxiliary service pressure line communicating a source of fluid pressure with said emergency chamber on said one side of said wall, an application valve connected in said main and auxiliary lines for simultaneous opening and closing of said lines, and a differential valve connected in said main and auxiliary lines downstream of said application valve and effective to open said auxiliary line in response to loss of pressure in said main line.

4. For use in a vehicle fluid pressure brake system having a spring-applied, fluid pressure-retracted emergency brake actuator, a fluid pressure applied service brake actuator, an application valve and a service pressure line communicating said vale and said service brake actuator, said emergency brake actuator having an area therewith occupied by a spring, means supplying service pressure to said area in response to activation of said application valve and loss of pressure in said service line.

5. The structure of claim 4 wherein said means includes an auxiliary service pressure line communicating said application valve with said area and a valve member connected to said first-named service and said auxiliary services lines, said valve member including means closing said auxiliary line in response to pressure in said first-named service line and opening said auxiliary line in response to loss of pressure in said first-named service line.

6. The structure of claim 5 wherein said application valve includes means for simultaneously controlling the flow of pressure in said first-named and auxiliary service lines.

7. The structure of claim 4 characterized by and including valve means for exhausting said area of said supplied pressure in response to deactivation of said application valve.

8. A fluid pressure vehicle brake system including a brake application valve, a brake actuator having a service chamber and an emergency chamber, a first movable wall in said service chamber, a second movable wall in said emergency chamber, means communicating said application valve with said service chamber on one side of said first wall, means supplying fluid pressure to said emergency chamber on one side of said second wall, a spring on the other side of said second wall and means communicating said application valve with said emergency chamber on said other side of said second wall in response to loss of fluid pressure in said service chamber.

9. For use with a brake actuator having a movable wall, a fluid pressure chamber on one side of said wall and a spring on the opposite side of said wall and urging said wall against the pressure in said chamber, a brake application valve and a conduit communicating said valve with said opposite side of said wall, a service brake actuator, a second conduit communicating said service actuator with said application valve and a control valve in said first-named conduit and responsive to loss of pressure in said second conduit to open communication of said application valve with said opposite side of said wall through said first-named conduit.

* * * * *